(12) United States Patent
Chong et al.

(10) Patent No.: US 11,851,095 B2
(45) Date of Patent: Dec. 26, 2023

(54) DRIVERLESS TRANSPORT SYSTEM

(71) Applicant: SSI Schäfer Automation GmbH (DE), Giebelstadt (DE)

(72) Inventors: Dennis Chong, Bremen (DE); Ralf Kleedörfer, Marktheidenfeld (DE)

(73) Assignee: SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 18/021,649

(22) PCT Filed: Sep. 23, 2021

(86) PCT No.: PCT/EP2021/076144
§ 371 (c)(1),
(2) Date: Feb. 16, 2023

(87) PCT Pub. No.: WO2022/063870
PCT Pub. Date: Mar. 31, 2022

(65) Prior Publication Data
US 2023/0347951 A1    Nov. 2, 2023

(30) Foreign Application Priority Data
Sep. 25, 2020  (DE) ..................... 10 2020 125 118.1

(51) Int. Cl.
*B61L 27/10*     (2022.01)
*B61L 15/00*     (2006.01)
(Continued)

(52) U.S. Cl.
CPC ............... *B61L 27/10* (2022.01); *B61L 3/002* (2013.01); *B61L 3/02* (2013.01); *B61L 15/0018* (2013.01);
(Continued)

(58) Field of Classification Search
CPC .. B61L 27/10; B61L 3/002; B61L 3/02; B61L 15/0018; B61L 21/10;
(Continued)

(56) References Cited

U.S. PATENT DOCUMENTS

| | | |
|---|---|---|
| 5,267,173 A | 11/1993 | Tanizawa et al. |
| 5,329,449 A | 7/1994 | Tanizawa et al. |

(Continued)

FOREIGN PATENT DOCUMENTS

| | | |
|---|---|---|
| DE | 69114945 T2 | 5/1996 |
| DE | 10162117 A1 | 7/2003 |

(Continued)

OTHER PUBLICATIONS

International Preliminary Report on Patentability (Chapter II) for International Application No. PCT/EP2021/076144, dated Oct. 28, 2022.

(Continued)

*Primary Examiner* — Zachary L Kuhfuss
(74) *Attorney, Agent, or Firm* — Jason H. Vick; Sheridan Ross, PC

(57) ABSTRACT

There is disclosed a driverless transport system, DTS, (10) comprising: a travelling course (12), formed of routes (14), preferably travelled unidirectionally, which are defined respectively by one track (28), and of markers (16); a fleet (18) of at least two driverless transport vehicles, DTV, (20) travelling along the tracks (28) in a forcibly guided manner; and at least one station (26) defined by: at least one of the tracks (28), at least one of the markers (16), and an individualizing assigned station identifier; wherein each of the stations (26) can comprise a terminal (70) for allocation of travelling destination and wherein each of the stations (26) represents an area of the travelling course (12), within which the DTVs (20) can get assigned a new travelling destination (Continued)

and/or can be loaded, unloaded, energetically charged, and/or stopped; wherein the markers (16) include information, which is station-specific by being associating the respective information with the respectively assigned station identifier; wherein each of the DTVs (20) comprises: a communication unit (52) for transmitting and receiving information; a marker-detection unit (54) for reading, preferably contactless, the information from the markers (16); and a controlling unit (58) for processing read and received information; and wherein communication between the DTV (20) and communication between the DTVs (20) and terminals (70) is respectively performed directly, and in particular in a DTV-unspecific manner.

18 Claims, 5 Drawing Sheets

(51) Int. Cl.
| | | |
|---|---|---|
| *B61L 3/02* | (2006.01) | |
| *B61L 3/00* | (2006.01) | |
| *B61L 21/10* | (2006.01) | |
| *G05D 1/00* | (2006.01) | |
| *G05D 1/02* | (2020.01) | |

(52) U.S. Cl.
CPC ............ *B61L 21/10* (2013.01); *G05D 1/0022* (2013.01); *G05D 1/021* (2013.01); *G05D 1/0289* (2013.01); *G05D 2201/0216* (2013.01)

(58) Field of Classification Search
CPC .... G05D 1/0022; G05D 1/021; G05D 1/0216; G05D 1/0289
See application file for complete search history.

(56) References Cited

U.S. PATENT DOCUMENTS

| | | | |
|---|---|---|---|
| 6,049,745 | A | 4/2000 | Douglas et al. |
| 9,014,902 | B1* | 4/2015 | Murphy ............... G05D 1/0297 701/26 |
| 9,625,481 | B2* | 4/2017 | Mellars ................... G01N 35/04 |
| 10,059,517 | B2* | 8/2018 | Hofmann ............. B65G 1/1378 |
| 10,425,158 | B2* | 9/2019 | Oh ........................ H04B 10/116 |
| 11,693,425 | B2* | 7/2023 | Ishikawa ............... B60W 30/09 701/301 |
| 2003/0234325 | A1 | 12/2003 | Marino et al. |
| 2015/0140668 | A1 | 5/2015 | Mellars et al. |
| 2020/0393849 | A1 | 12/2020 | Ishikawa |

FOREIGN PATENT DOCUMENTS

| | | |
|---|---|---|
| DE | 102014111396 A1 | 2/2016 |
| EP | 0472028 B1 | 11/1995 |
| EP | 3180275 B1 | 12/2017 |
| WO | WO 2019/123660 A1 | 6/2019 |

OTHER PUBLICATIONS

International Preliminary Report for International Application No. PCT/EP2021/076144, dated Dec. 2, 2021.
Written Opinion for International Application No. PCT/EP2021/076144, dated Dec. 2, 2021.
Office Action (Including Translation) for corresponding German Patent Application No. 10 2020 125 118.1, dated Mar. 25, 2021.
Decision to Grant (Including Translation) for corresponding German Patent Application No. 10 2020 125 118.1, dated Dec. 15, 2022.

* cited by examiner

DRIVERLESS TRANSPORT SYSTEM

CROSS REFERENCE TO RELATED APPLICATIONS

This application is a national stage application under 35 U.S.C. 371 of PCT Application No. PCT/EP2021/076144 having an international filing date of 23 Sep. 2021, which designated the United States, which PCT application claimed the benefit of German Application No. 10 2020 125 118.1, filed 25 Sep. 2020, each of which are incorporated herein by reference in their entirety.

The present disclosure relates to a driverless transport system including a fleet of multiple driverless transport vehicles travelling in a forcibly guided manner along a travelling course.

Master controllers in conventional driverless transport systems (DTS) take care that each vehicle gets centrally and automatically assigned a travelling order. Travelling order is defined by at least one destination point within the travelling course. Typically, allocation of destination is performed by travelling-order processing (planning of travelling orders) which can be integrated into the master controller, or which can be implemented discretely. Optionally, the travelling order can even include a starting point. A conventional travelling order can further include each branching-off point being essential for navigation between the start and destination points, in this case a map of the travelling course is recorded in the master controller, and the navigation or path finding is performed by the master controller centrally. Also, the conventional master controller determines the path throughout the travelling course (in advance and/or dynamically) from the start to the destination.

Optionally, the map can (also) be recorded in the conventional vehicle. In this case the travelling order substantially includes the destination point, and, if necessary, one or more intermediate points, wherein the vehicle may determine freely its path through the travelling course based on the map recorded in the vehicle. In this case the vehicle is provided with a corresponding "intelligence", i.e. the vehicle is equipped with a corresponding data-processing device (microcontroller, computer, etc.). In this case the navigation finding, or path finding, is performed decentralized.

Independent of whether the navigation is performed centralized or decentralized, conventionally each of the vehicles is connected via a communication channel almost continuously to the master controller for exchanging at least the travelling destination between each other, as well as instructions on regulating the traffic of the vehicles (traffic regulation and control of traffic). For the sake of regulating the traffic, the master controller can prioritize specific travelling orders allocated to specific vehicles. For example, this means that a specific one of the vehicles can always have right-of-way with regard to any other vehicle. If the master controller recognizes from the current (vehicle) data (position, order, speed, etc.) that collision, deadlock, or congestion is directly imminent, the master controller regulates the traffic while considering potential prioritizations so that no collision, deadlock, or congestion occurs.

For this purpose, conventional master controllers often communicate with each of the DTVs of the fleet via a (computer) network, such as WLAN.

The document EP 3 180 275 B1 describes a fleet of vehicles being navigated by one master controller in the above-mentioned manner. In this document the master controller is referred to as a "fleet manager", and the above-mentioned travelling-order processing is communicated to the fleet manager by one (separate) material-flow computer (MFC). Also, the map is recorded in the vehicles. Additionally, EP 3 180 275 B1 describes a conventional configuration process as well as the communication between the vehicles and the fleet manager, and the exchanged data.

In general, the term "fleet" means a plurality of vehicles. One single vehicle cannot form a fleet. The vehicles need to be pre-configured for this purpose, i.e. each of the vehicles is provided with an individual identifier. The master controller can specifically address and track each of the vehicles. The tracking refers to both the travelling order and a (current) position of the vehicle within the travelling course. The control of traffic can be implemented via the position being reported back to the master controller by the vehicle.

For example, when two vehicles are on a collision course, then the master controller intervenes by delaying or stopping one of the vehicles to prevent the approaching collision.

This requires transmission of position for the vehicles in almost real time. On the other hand, the conventional determination of position can be performed (centralized) in the master controller and/or (decentralized) in the vehicles themselves.

The control of traffic, by the master controller, requires much communication between the vehicles and the master controller. The workload is high for the master controller. The control of traffic is complex, since it is regulated by the master controller, in particular in real time, for each of the vehicles.

The master controller needs to be present, thereby increasing complexity of system and the costs. These drawbacks have prevented, for example, many operators of smaller order-picking installations and production installations, which are operated in particular manually, from automizing the material flow by means of DTS. The system operator was not able to implement the DTS without external aid. The travelling course needed to be designed and installed by the DTS manufacturer. This also applies for virtual tracks which are determined, for example, by using a grid of magnets in the ground, reflectors on the walls, or laser-based detection of contours (SLAM). The master controller and the vehicles need to be configured by the DTS manufacturer. The master controller requires permanent data connections to the vehicles, which are implemented via a tremendous system of fixed lines or a radio system (e.g., WLAN). This increases the costs additionally, and prevents system operators from automizing the material flow without external aid by using DTS.

The document DE 691 14 945 T2 relates to a vehicle-control system having tracks of multiple branches.

The document DE 101 62 117 A1 relates to a decentralized system for conducting transport services in a fully automatic manner.

Therefore, it is an object to provide a DTS overcoming the above-described drawbacks. In particular, the DTS should be installable by the system operator itself. A master controller is to be omitted, however, without abandoning secure control of traffic.

This object is solved by a driverless transport system, DTS, comprising: a travelling course formed of routes travelled preferably unidirectionally, which are respectively defined by one track, and formed of markers; a fleet of at least two driverless transport vehicles, DTVs, travelling along the tracks in a forcibly guided manner; and at least one station defined by: at least one of the tracks, at least one of the markers, and an individualizing assigned station identifier; wherein each of the stations can comprise a terminal for allocating a travelling destination, and wherein each of the stations represents an area of the travelling course in which a new travelling destination can be allocated to the DTVs and/or in which the DTVs can be loaded, unloaded, energetically charged, and/or stopped; wherein the markers include information, which is station-specific by associating the respective information with the respectively assigned station identifier; wherein each of the DTVs comprises: a communication unit for transmitting and receiving information; a marker-detection unit for reading, preferably contactless, the information from the markers; and a controlling unit for processing read and received information; and wherein communication between the DTVs and communication between the DTVs and the terminals are respectively performed directly, and in particular in a DTV-unspecific manner. The control of traffic within the DTS is performed in terms of direct communication between the DTVs. This means that no interacting master controller is connected between them, which, for example, prioritizes DTV-specific travelling orders, or distributes DTV-specific travelling orders (travelling destinations). For example, in case no interacting master controller being connected between them, direct communication can also be performed via WLAN, wherein, however, switching units (such as an access point) may be connected therebetween. Thus, direct means, in particular, free of any master controller. Free of any master controller means that the DTS does not include any master controller.

The DTVs control the traffic autonomously by communicating, in a station-specific manner, rules of right-of-way directly between each other. In general, the communication is performed in a DTV-unspecific manner, i.e. the DTVs are not required to possess any individualizing identifier being transmitted for addressing the DTVs.

The same applies regarding the allocation of a travelling destination. When a travelling destination is allocated, for example, a (station) terminal can allocate a new travelling destination to a DTV. In this case, the communication is also performed directly and in a DTV-unspecific manner in the mentioned-above sense.

The complexity of the DTS is reduced since the master controller is omitted. The workload for processing data being relevant for controlling the traffic is reduced.

The DTS of the present disclosure can be installed by system operators themselves. Initial configuration of the master controller (e.g., recording the topology of the travelling course) and of the DTVs (e.g., allocating unique identifiers to DTVs) is omitted. The DTVs do not need to be addressed specifically for the purpose of traffic control and for allocation of travelling destinations. In particular, the DTVs are not required to recognize each other (unambiguously). One coincidencing station identifier is sufficient for implementing an interaction, in particular regulation of right-of-way, between the DTVs.

The station identifier is only valid, or effective, in a spatially limited manner so that the DTVs located outside of the area of validity of a respective station do not respond to these communication signals despite a potential receipt, since the DTVs know, based on the information from the marker read last, that they are no longer, or not yet, located within the area of the communicating unit (DTV or terminal).

Tracking the DTVs within the DTS for controlling traffic, and order processing are omitted.

The DTV of the present disclosure is suitable for automizing material flow in existing order-picking installations, or in production installations, wherein the implementation is preferably conducted by the system operator himself.

The DTS of the present disclosure is preferably structured according to a modular-design principle so that a travelling course can be established by untrained persons.

Preferably, the controlling unit is further configured to: cause an interaction, in particular regulation of right-of-way, between the respective DTV and another one of the DTVs only if information included in a marker read last by the respective DTV is associated with one of the station identifiers being identical to a station identifier which has been received last by the respective DTV from the other DTV, and cause an interaction, in particular an allocation of a new travelling destination, between the respective DTV and one of the terminals only if an information read last by the respective DTV from a marker is associated with one of the station identifiers being identical to a station identifier received last by the respective DTV from the one of the terminals.

In particular, the markers include traffic-control markers, wherein each of the traffic-control markers includes a station-specific information on regulation of right-of-way within the area of the respectively assigned station, in particular at a merging point located nearest in a downstream direction, and the controlling unit is further configured, when the last-read marker is a traffic-control marker, to cause continuation of travel of the respective DTV without any stop if the information from the last-read marker represents having right-of-way, and cause stop of the travel if the information from the last-read traffic-control marker represents obeying right-of-way and if information is received from another one of the DTVs representing having right-of-way and being associated with the identical station identifier as the information from the traffic-control marker read last.

In addition, the other DTV can be configured to receive the station-specific communication signal transmitted by the one DTV, and to give or obey the right-of-way when the traffic-control marker read last by the other DTV is assigned to the same station.

Thus, communication between the DTVs of the DTS is always station-specific. The DTVs interact with each other only if the communicated information is assigned to the same station. This allows arranging different stations spatially close to each other so that the DTVs within the one station are not disturbed by communication of other DTVs acting in the adjacent station arranged spatially close.

As mentioned above, within the DTV traffic control is regulated exclusively by the DTVs themselves in that the DTVs communicate, by means of the respective communication unit, directly with each other, and implement regulation of right-of-way being valid at a current position of the respective DTV in accordance with the right-of-way control rules.

Further, each of the DTVs can comprise a data storage where traffic-control rules, and in particular navigation rules, being the same for each of the DTVs are recorded permanently.

Also, it is preferred to configure the communication unit for wireless short-distance communication, in particular exclusively.

The installation, by the system operator, of a "global" communication network operating area-wide within the installation is not required. Often, retroactive installation of a corresponding global communication network is not possible because there will always be spaces free of net. The exchange of information being relevant for the traffic control is conducted via the DTVs exclusively. The ranges of the communication units of the DTVs are short, since only such ones of the DTVs are required to communicate with each other which are so close to each other that they may collide with each other.

Consumption of energy is reduced since weaker communication units (transmitters/receivers) can be used for the short-distance communication.

DTV-specific configuration of the communication, and of the communication network, is omitted as mentioned above.

Further, it is advantageous when the markers further include station-specific navigation markers which respectively include information on a branching-off point located nearest in a downstream direction, wherein the information on a branching-off point located nearest in a downstream direction indicates, in particular, number and orientations of branching-off tracks, an orientation of the track of the main route, and/or a station identifier.

Thus, the markers of the present disclosure are not only used for controlling the traffic but also for navigation (path finding). The control of traffic and the control of navigation are both performed based on rules which are identical for each of the DTVs. The differentiation is conducted based on the station identifier respectively associated with the information. Interaction between the DTVs is performed only in cases when the DTVs currently process information including the same station identifier.

Further, it is preferred to configure the control unit such that, if the last-read marker is one of the navigation markers, based on the information from the last-read marker a corresponding navigation command is generated and output to a travelling unit of the DTV.

The DTV finds its way through the travelling course itself. The processing of information, and in particular of finding the path and route, is conducted in the DTV itself. Superordinated conventional master controller is not required. Thus, the DTVs are provided with sufficient own intelligence for navigating through the travelling course to the desired travelling destination.

In particular, a DTV-specific travelling destination is further recorded in an overwritable manner in the data memory. Preferably, navigation through the travelling course to the DTV-specific travelling destination is controlled by the respective DTV alone by travelling to the DTV-specific travelling destination based on the navigation rules, and in particular based further on an information of a last-read navigation marker.

In a further particular embodiment the DTV further comprises: a track-detection unit; a steering unit; and/or a travelling unit configured to move the DTV along the tracks, stop the DTV, and cause the DTV, by means of the steering unit, to turn.

The track-detection unit realizes the forcible guidance of the DTV. The steering unit takes care that the DTV can turn. The travelling unit moves the DTV through the travelling course and stops the DTV at stopping points.

In another preferred embodiment the routes are passed by each of the DTVs, during a fixed time period, always in one single direction only.

The unidirectional movement of the DTVs through the travelling course guarantees that the DTVs cannot meet within the travelling course. Thus, the coordination of the travelling direction simplifies the control of traffic.

Further, it is preferred to form the DTS free of any master controller, and preferably, to not record any information on topology of the travelling course in the data memory of the DTV.

In particular, the markers further include station markers.

At the site of the station markers persons or machines can arbitrarily conduct interactions with the (waiting) DTVs such as loading the DTV, unloading the DTV, or energetically charging the DTV. This depends on the type of the station 26.

Typically, the station markers are positioned at locations where in existing installations work stations (e.g., a picking station, a filling point, etc.) are already positioned. In this manner, different types of stations can be defined. Upon the initial design of a new installation, the station markers are positioned at locations desired by the system operator, wherein the travelling course can also be planned ideally in accordance with the system operator's desires.

In a further advantageous embodiment the station markers include information on a respectively assigned station, wherein the respectively assigned station preferably represents a stopping point where the DTV is stopped for a predetermined period of time, or permanently, until it receives a new travelling destination.

Preferably, the markers are re-writable data points which are positioned on, or along, the routes and in which new information can be written contactless by the DTV, or by means of an external data-writing device.

In this manner it is possible to re-configure the markers. For example, a traffic-control marker can be converted into a navigation marker, and vice versa. This can be an advantage when an installation is extended or amended, because old markers do not need to be removed and replaced by new markers.

In particular, the routes include: a main route, which preferably defines a round course; and at least one branch route, which preferably defines a bay, a track of which is branched-off from the track of the main route in a branching-off point and a track of which is merged again with the track of the main route in a downstream merging point.

It is clear that the above-mentioned and hereinafter still to be explained features cannot be used in the respectively given combination only, but also in different combinations or alone without departing from the scope of the present invention.

Embodiments of the invention are illustrated in the drawings and will be explained in more detail in the following description.

Figure 1:
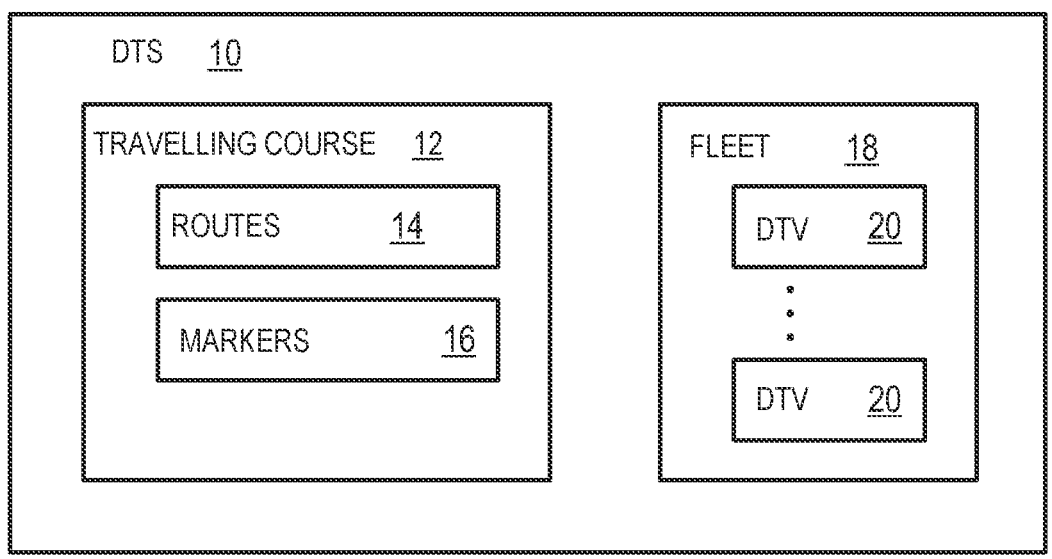
FIG. 1 shows a block diagram of a driverless transport system.

FIG. 1 shows a block diagram of a driverless transport system 10 which is also designated as DTS 10 hereinafter. The DTS 10 includes a travelling course 12 and a fleet 18. The travelling course 12 is formed of routes 14 being travelled unidirectionally and of markers 16. The fleet 18 is formed of at least two driverless transport vehicles (DTVs) 20.

In contrast to driver-operated vehicles, in a known environment the DTV 20 orientate themselves autonomously and travel autonomously (forcibly guided) along the routes 14 without being steered by an operator directly. For example, conventional forklift trucks are driver-operated vehicles.

The DTVs 20 guarantee safe acting, i.e. all measures are performed autonomously by the DTV 20 in order to protect persons as well as for protection against damages of load and items transported within the environment, for example, by providing the DTV 20 with one or more (distance) sensors (not illustrated) for automatically detecting obstacles and with a controller which causes an (emergency) stop of the DTV 20 in case of an approaching collision recognized based on the sensor signals.

Hereinafter, the term "navigation" is to be understood in the light of DIN 13312:2005-02 as finding a path (routing) through the travelling course 12 and as determination of position within the travelling course 12. In the present disclosure, the finding of a path, or route, (path finding) through the travelling course 12 from an arbitrary starting point to an arbitrary destination point is conducted by the DTV 20 itself, however, without the DTV 20 having knowledge of a map (topology) of the travelling course 12. The DTV 20 does not know the exact course of the routes 14 within the travelling course 12. The DTV 20 has no knowledge on length, shape, or position of the routes 14 of the travelling course 12. The lengths, shapes, and positions of the routes 14, which are forming the travelling course 12, typically define the "map" of the travelling course 12 which map, in the prior art, is recorded in a superordinated (not illustrated, because not present) master controller (acting centralized or decentralized) and/or in the DTV 20 itself. The DTV 20 of the present disclosure navigates without a corresponding map, i.e. the DTV 20 navigates without maps and free of any master controller.

Thus, the DTS 10 is not provided with any master controller which, as in the prior art, takes care of the navigation of each individual DTV 20 (in a superordinated manner) and of the control of traffic between the DTV 20.

In the present disclosure, the term "traffic control" means regulation of traffic of multiple DTVs 20 moving in the travelling course 12 simultaneously. The primary goal of the traffic control is avoiding collisions between the DTVs 20. Alternatively, or additionally, deadlocks and/or jams are to be avoided. In a deadlock, two DTVs 20 approach each other such that the DTVs 20 detect each other mutually by means of its distance sensors, and get wedged subsequently such that the DTVs 20 cannot pass each other although no real collision has occurred. Upon collision the DTVs 20 hit each other such that damages to the DTVs 20 and/or the transported loads occur.

In the present disclosure the traffic control is conducted by the DTVs 20 themselves, i.e. without any master controller, as will be explained in more detail below.

In the present disclosure a travelling order is transmitted to the DTVs 20 by an operator (manual activation) or by a travelling-order processing (automatic activation), which is not to be confused with conventional master controller, as will be explained in more detail below.

Figure 2:
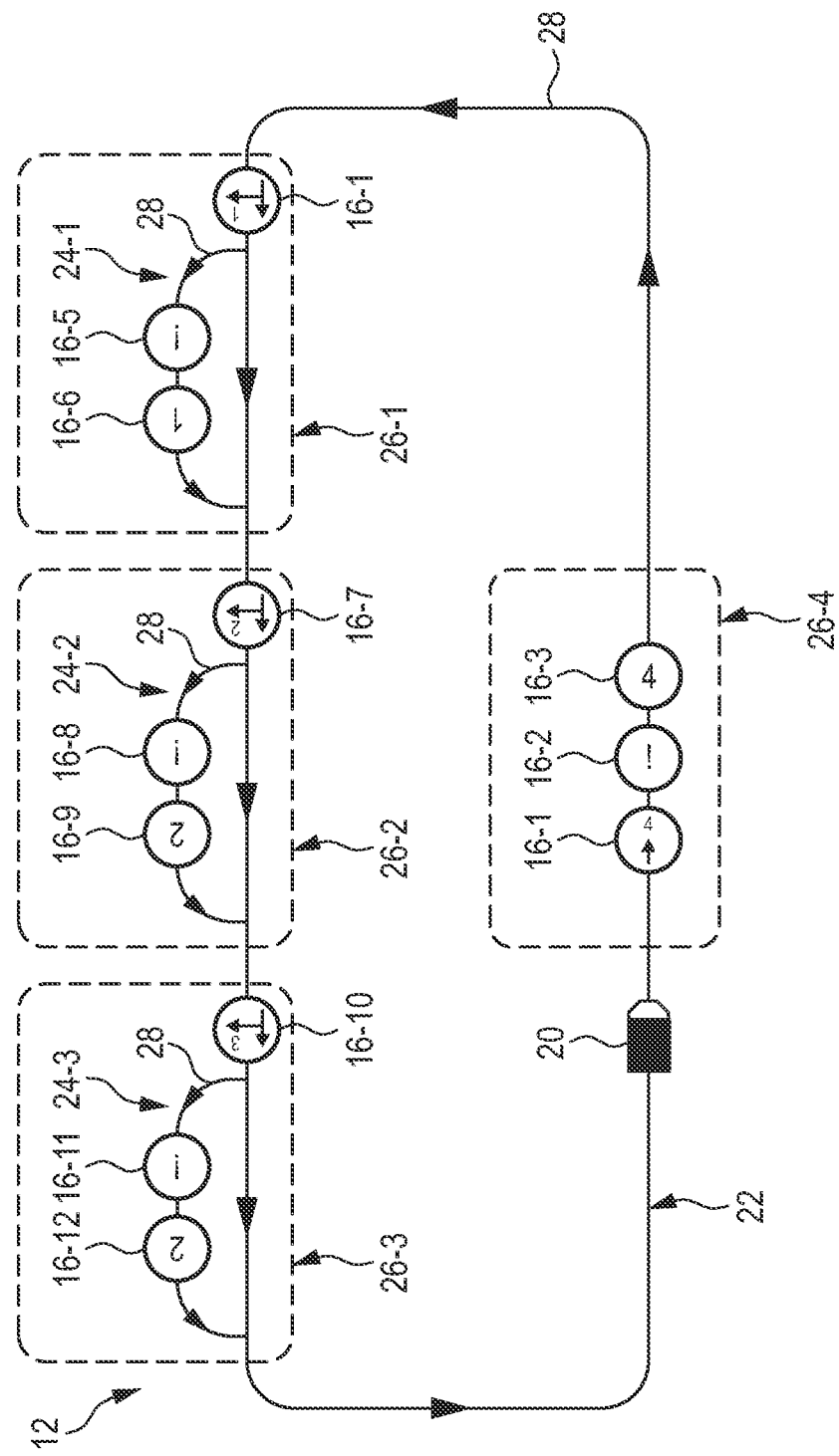
FIG. 2 shows a schematic travelling course including four stations.

FIG. 2 shows a topology (positional relation between objects) of an exemplary travelling course 12. The travelling course 12 of FIG. 2 includes a main route 22 as well as, for example, three branch routes 24-1 to 24-3. It is clear that the travelling course 12 can comprise, in general, more or less branch routes 24. The travelling course 12 also includes one or more stations 26 (cf. FIG. 2), which are explained in more detail later.

For facilitating the explanation, only one single DTV 20 is shown in FIG. 2. It is clear that, typically, the travelling course 12 of FIG. 2 can be travelled by more than DTV 20 at the same time.

For example, the DTVs 20 travel clockwise along the main route 22 in FIG. 2. It is clear that the travelling course 12 can also be travelled in a counterclockwise direction. In general, each of the DTVs 20 of the fleet 18 (not shown in more detail here) travels through the travelling course 12 always in the same direction. However, it is clear that the travelling direction can change over time. For example, it is possible thus that the travelling course 12 is travelled counterclockwise in the morning time, and travelled clockwise in the afternoon. Duration of these temporal phases can be selected freely.

Further, twelve exemplary markers 16-1 to 16-12 are shown in FIG. 2. In general, the markers 16 are positioned on or immediately next to the routes 14 for being detected and read by the DTV 20, as will be explained in more detail hereinafter. The markers 16 represent data points where information is recorded which can be read (and also be written, if necessary) by the DTVs 20. Preferably, the markers 16 are not linked up, i.e. they are not connected to a superordinated control or computer network for changing recorded data. The markers 16 are physically present and, in particular, operable without energy. Some exemplary markers 16 are represented by QR codes, bar codes, and RFID tags.

In general, one or more markers 16 define one station 26. The station 26 includes, in addition to the marker(s) 16, at least one route 14, or the corresponding track 28 which can also be virtual, and one uniquely (and bijectively) assigned station identifier.

In FIG. 2, exemplarily four stations 26-1 to 26-4 are shown. The stations 26-1 to 26-3 respectively include one section of the main route 22, one of the branch routes 24, and three markers 16. The station 26-4 includes one section of the main route 22 and three markers 16. The station 26-4 is also arranged directly on the main route 22 and does not include any branch routes 24. Also, travelling courses 12 can be defined, wherein station(s) 26 thereof can be positioned on the main route 22 or in one or more branch routes 24 only.

In general, length and shape of the route sections belonging to the stations 26 can be selected freely by the system operator.

Figure 3:
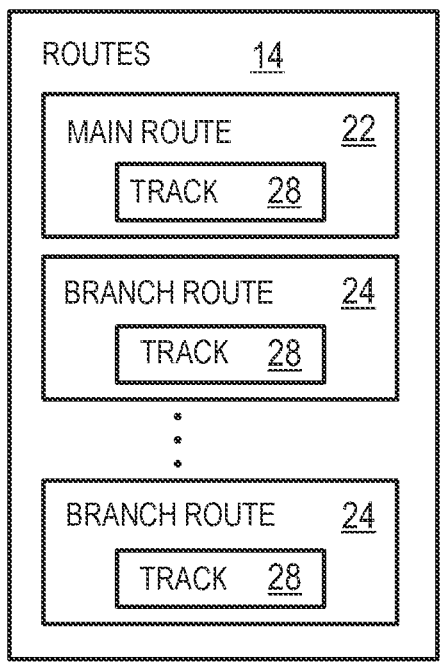
FIG. 3 shows a block diagram of routes.

As illustrated in FIG. 3, each of the routes 14 comprises its (own) track 28. The routes 14, or the tracks 28, can be optically visible when the system operator positions corresponding (color) traces on the ground (e.g., by adhering, depositing, painting, etc.). Alternatively or exclusively, the tracks 28 can be virtual, for example, if the system operator positions the markers 16 only on the ground along an uniform raster (not illustrated), the routes 14 and the tracks 28 extending (optically invisible) between the markers 16 respectively.

The tracks 28 can exist physically, and/or be defined virtually between two points of topology (markers 16).

In general, the travelling course 12 sets a path which the DTVs 20 follow in a forcibly guided manner. This means that the DTVs 20 follow the tracks 28 which are detected, preferably in contactless manner, by the DTVs 20, as will be explained in more detail hereinafter.

In simple case, the tracks 28 represent tracks being adhered to or printed on the floor and which are sensed, for example, optically by cameras of the DTVs 20. Thus, the DTVs 20 are not capable of navigating arbitrarily (i.e., autonomously), but need to follow the tracks 28. Thus, the DTV 20s can neither travel to arbitrary locations in space nor travel on, or along, arbitrary paths.

The markers 16 include information, and in particular rules (on right-of way and/or navigation), to be obeyed by the DTVs 20 while the DTVs 20 move through the travelling course 12. Typically, this information is station-specific, i.e. the information is assigned unambiguously to one of the stations 26 by associating it with a corresponding (station) identifier. Station-specific information is valid, preferably spatially limited, in the area of the corresponding station 26 only.

The markers 16 are read, internally interpreted, and internally implemented by the DTVs 20, as will be explained in more detail hereinafter. A superordinated logic, such as a master controller, is not needed.

Also, the markers 16 can include information causing the DTVs 20 to perform predetermined functions and operations. Exemplary operations are: fine positioning; branching off; requesting a new travelling destination; giving right-of-way; obeying right-of-way; stopping; charging of energy; speed limit; turning (distance) sensors on/off. During the fine positioning the DTV reduces its normal travelling speed to immediately stop later on. During the branching off the DTV 20 exits the main route 22 towards one of the stations 26. During requesting free DTVs 20, which currently do not have any travelling destination (travelling order), are directed towards one of the stations 26 for the purpose of allocating a travelling destination. During giving right-of-way the DTV 20 allows another DTV 20 to pass at an intersection point or merging point. The DTV 20 stops at a stopping point. Speed limits set areas where the DTV 20 must not travel at its maximum speed but at reduced speed. The sensors are turned on/off when the DTV 20 must travel, for example, through very tight areas. However, in these areas the DTV 20 must not travel at the maximum speed.

One particular advantage of the DTS 10 is to be seen in that the system operator itself may define the travelling course 12, and also install the same, so that individual demands of the system operator may be considered. The travelling course 12 can be changed at any time. The routes 14 and the markers 16 can be prepared by the manufacturer of the system, in accordance with a modular-design principle, for being positioned (permanently) on the floor by the system operator later. The system operator can adhere the markers 16, for example, onto the tracks 28 in appropriate distances. (Data) connection of the markers 16 to a master controller is not present and not required since the markers 16 already include each relevant information. Hereinafter, it will be explained which rules are to be obeyed when planning and establishing travelling courses 12.

Typically, each travelling course 12 is composed of a round course. The round course is defined by the main route 22, which is formed preferably in a closed manner, i.e. in terms of a loop. The DTVs 20 can circulate in the round course in a direction set by the system operator. In this case, each of the DTVs 20 travels in the same direction.

Stations 26, as many as desired, can be arranged on the main route 22. Alternatively, or additionally, arbitrary many stations 26 can be provided, which are branched-off from the main route 22 via branch routes 24, and guided back into the main route 24 again.

Figure 4:
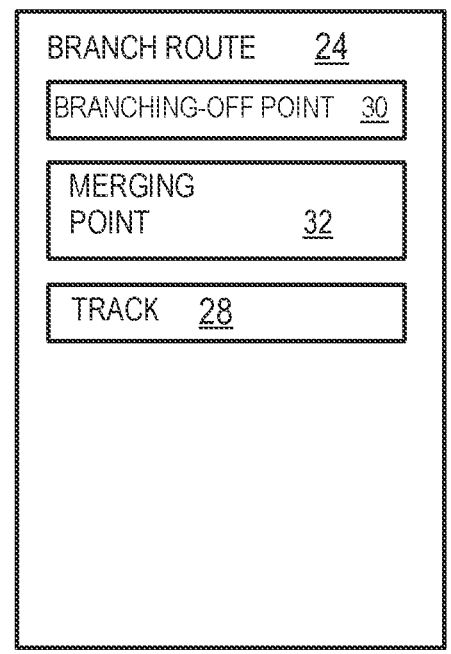
FIG. 4 shows a block diagram of an branch route.

Therefore, each of the branch routes 24 comprises a branching-off point 30, a merging point 32, and the track 28 (cf. FIG. 2), as illustrated in FIG. 4 in terms of a block diagram.

The branch routes 24 functionally define bays 34 where the (work) stations 26 are typically arranged. Further, the branch route 24 can be used functionally as overtaking tracks and/or buffers (parking spaces).

Figure 5:
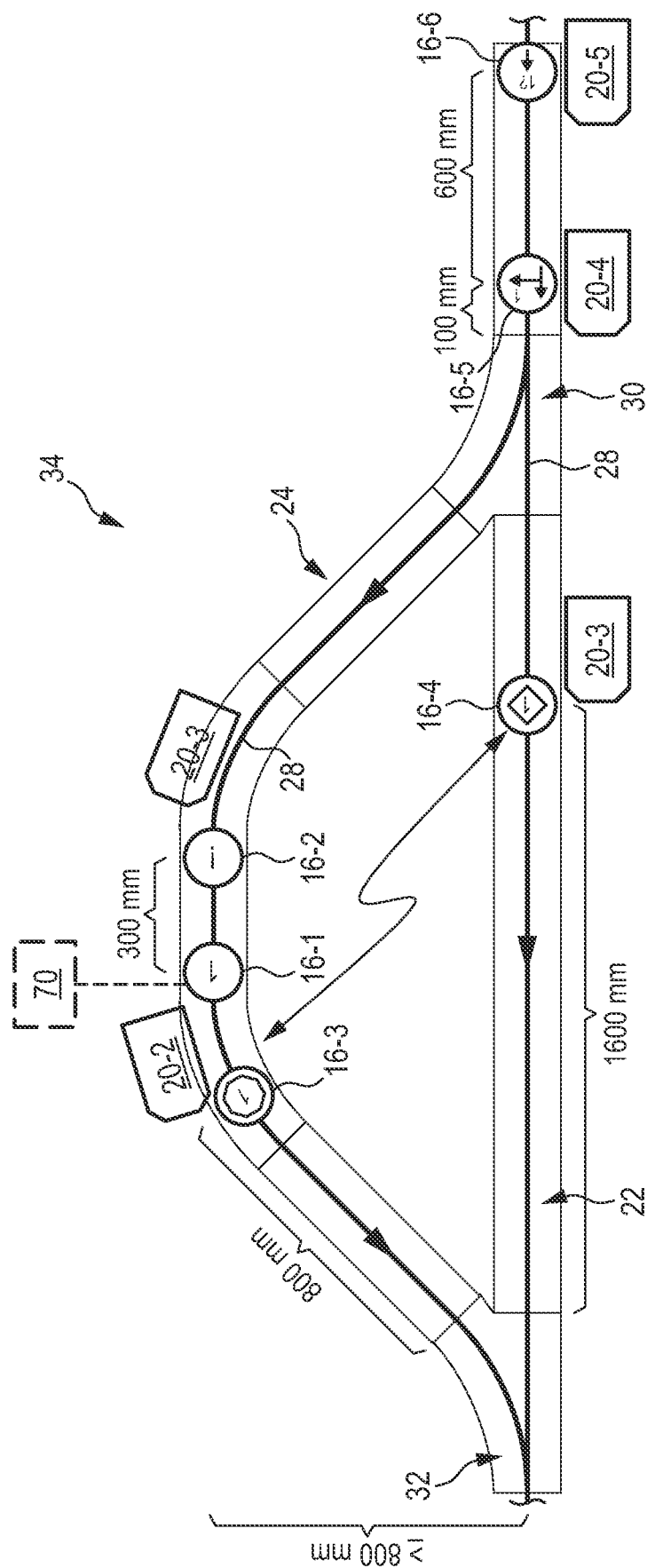
FIG. 5 shows a schematically illustrated bay including a station comprising several markers.

FIG. 5 exemplary illustrates one isolated bay 34 being part of a travelling course 12 which is not depicted in more detail here. The bay 34 of FIG. 5 defines, for example, one of the stations 26 being designated exemplarily by the number "1". The number "1" is a (station) identifier, or an ID (i.e., a bijective identifier) designating the station 26 of FIG. 26 within the DTS 10 unambiguously.

The bay 34 of FIG. 5 includes a section of the main route 22 and one branch route 24 starting in branching-off point 30 and ending in merging point 32. In the branching-off point 30 the track 28 of the branch route 24 branches off the track 28 of the main route 22. Thus, the one track 28 of the main route 22 becomes two tracks 28, wherein the track 28 of the main route 22 is continued linearly and the track 28 of the branch route 24 turns right in the travelling direction. The part of the travelling course 12 illustrated in FIG. 5 is travelled from the right to the left. The tracks 28 of the main route 22 and the branch route 24 are merged again in the merging point 32. This means that the two tracks 28 become one single track 28 again.

The marker 16-1 defines a stopping point for the DTVs 20 within the station 26 including the designation "1" where the DTV 20 can receive or deliver, for example, goods (which are not shown and designated here). DTVs 20, which are on the way to this station "1" and thus include the marker 16-1 as destination of a travelling order, will stop at the marker 16-1 and wait for new input of destination, as will be explained in more detail hereinafter. The marker 16-1 defines the actual position of the station "1". However, additional markers 16-2 to 16-6, almost each of which is associated with the identical station identifier (here "1"), belong to the station "1" as well. Merely the marker 16-2 is not station-specific since it includes information which is generally valid and does not need to be associated with the station identifier, but could be associated therewith.

The marker 16-2 is positioned upstream to the marker 16-1. In FIG. 5 the marker 16-2 is positioned, for example, at a distance of 300 mm relative to the marker 16-1. The marker 16-2 includes information causing fine positioning of the approaching DTV 20-1. Since the DTVs 20 travel, for example, with a (nominal) travelling speed of, for example, 1 m/s the DTV 20-1 needs to be decelerated on time briefly before reaching the station "1" (marker 16-1) so that the DTV 20-1 can be positioned at the station "1" exactly. It is clear that the fine positioning is optional and depends on the type of vehicle (e.g., average speed, braking distance, etc.). The marker 16-2 can be symbolized, for example, by an exclamation mark and include information that the travelling speed is to be throttled from here to a smaller value. Further, the marker 16-2 can include information on how far the marker 16-1 is still away. The marker 16-2 does not need to be station-specific, i.e. does not need to include information on the station identifier. However, if one branch route 24 includes several subsequent stations 26 it can be reasonable to configure also the fine-positioning marker 26-2 in a station-specific manner, i.e. to associate it with the corresponding station identifier.

If one DTV 20 exits again the station "1", i.e. the marker 16-1, upon an earlier allocation of a corresponding destination within the travelling course 12, it reaches the downstream station-specific marker 16-3, cf. DTV 20-2. The marker 16-3 is station-specific because it includes the station identifier "1" in terms of information.

The station identifiers are exemplarily illustrated in terms of integers. It is clear that the station identifiers can also be realized by different symbols, such as letters or the like, respectively designating the assigned stations 26 unambiguously.

The marker 16-3 exemplarily symbolizes a stopping function for the station "1". In general, the functional symbols can be selected arbitrarily, and the eight-sided shape of a stop sign, which has been selected here, is only of an exemplary nature in order to visualize to the function of the respective marker 16 to an operator or the system operator. In general, the markers 16 do not need to be provided with symbols necessarily. It is sufficient if the markers 16 include information on a corresponding function (fine positioning, obeying right-of-way, having right-of-way, stopping point, branching-off point, merging point, etc.). For the DTV 20 the marker 16-3 signals a potential (temporary) stopping point and is required in particular if two tracks 28 are merged again through a merging point 32.

This is the case in FIG. 5 because the track 28 of the branch route 24 flows back into the track 28 of the main route 22. The DTV 20-2 passing the marker 16-3 reads this marker 16-3, evaluates the information included therein, stops if necessary, and sends, optionally directly, to other DTV 20 its intention of travelling into the main route 22 again in the area of the station "1", as will be explained in more detail hereinafter. In particular, the DTV 20-2 checks whether it has received a signal of right-of-way from another DTV 20, such as from the DTV 20-3, which is associated with the same station identifier "1". If no other DTV 20 is on its way within the immediate environment of the station "1" emitting a corresponding signal of right-of-way (having right-of-way), the DTV 20-2 can continue its path from the marker 16-3 to the merging point 32.

However, signal of way-of-right could be transmitted by the other DTV 20-3 traveling on the main route 22 in the area of the station "1", and there reaching the marker 16-4. The marker 16-4 is read by the other DTV 20-3 and causes the other DTV 20-3 to transmit a signal of having right-of-way, which is specific for the (work) station "1" because it includes the corresponding station identifier. Analogously, this signal of having right-of-way includes the information that a DTV 20, which intends to pass station "1" and has the right-of-way (having right-of-way) prior to any of the other DTVs 20 within the station "1", is on the main route 22 in the area of the station "1". Other DTVs 20, such as the DTV 20-2, which are located on the branch route 24 of the station "1" are sufficiently close, i.e. they are located in the area of the same station "1", to receive and need to obey the signal of right-of-way. If the DTV 20-2 located at the marker 16-3 receives this signal of right-of-way, the DTV 20-2 stops at the marker 16-3, allows the DTV 20-3 transmitting the signal of having the right-of-way in the station "1", to pass, and then enters the main route 22 itself because the DTVs 20-2 and 20-3 both move within the area of the same station "1" as it is derivable from the transmitted coincidencing station identifier. DTV-specific communication does not occur, i.e. the DTVs 20-2 and 20-3 neither exchange DTV identifiers nor do they address each other based thereon. They talk directly to each other, cf. the arrow in FIG. 5.

Other DTVs 20 (not shown in FIG. 5) located within the communication range but outside of the station "1", if necessary, can indeed also receive the signal of having the right-of-way but recognize that they are not concerned based on the station identifier. The station identifiers are different in this case. These other DTVs 20 have not read the identifier of the station "1" in the immediate past and therefore know that they are not located within the area of the station "1". In particular, this means that these other DTVs 20 may indeed have read the same station identifier once at a time but have overwritten the same since they have read marker 16, information of which is associated with another station identifier, in the meantime (i.e. last). Alternatively, a last-read station identifier may no longer be valid, such as after a predetermined timeout, after covering a predetermined length of a travelling route, and/or after recognition of the merging point 32.

It is clear that the respective station identifier being currently valid can be stored (separately) in the respective DTV 20.

In this manner the traffic in the environment of the station "1" is controlled without any master controller in terms of direct DTV-unspecific communication between the DTVs 20.

The marker (of having the right-of-way) 16-4 is located sufficiently far away from the merging point 32, like the marker (of obeying the right-of-way) 16-3, so that collision of the DTVs 20 approaching the merging point 32 almost simultaneously is excluded.

The distances of the markers 16-3 and 16-4 are selected (by the manufacturer of the system) to be exemplarily 800 mm and 1,600 mm. The magnitude of these distances depends on the travelling velocities and reaction speed of the DTVs 20 and can be varied. The manufacturer of the system can provide, for example, corresponding gauges of distance to the system operator for positioning the markers 16-3 and 16-3 at the right location.

Figure 6:
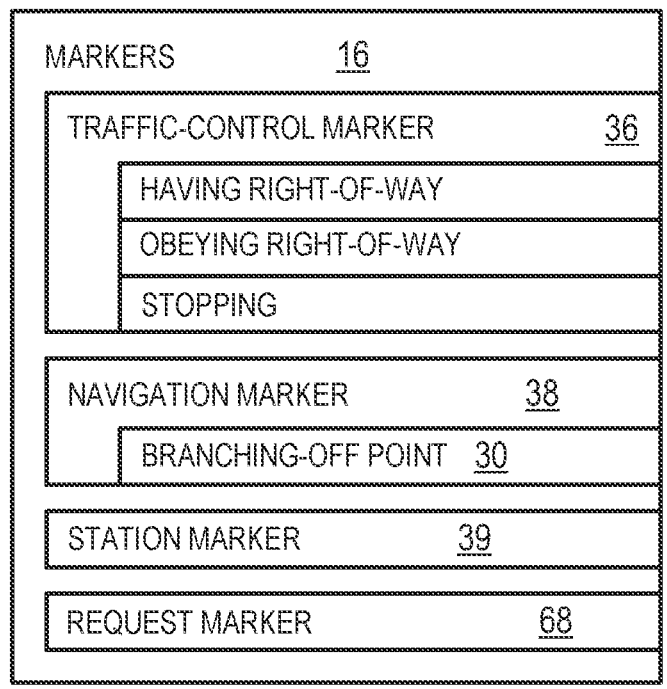
FIG. 6 shows a block diagram of markers.

As illustrated by block diagram in FIG. 6, the markers 16 can be traffic-control markers 36, navigation markers 38, and station markers 39. This enumeration is not exclusive. Further, for example, requesting markers 68 and/or other types of marker may also be included.

The traffic-control markers 36 include information on regulations of right-of-way within areas of the travelling course 12 being spatially restricted and designated by the stations 26. The traffic-control markers 36 are station-specific, i.e. associated with the corresponding station identifier.

In particular, regulation of right-of-way is required upstream of the merging points 32 where risk exists that the DTVs 20 collide with each other when travelling on different tracks 28, which are united. The traffic-control markers 36 regulate, in particular, the right-of-way, obeying the right-of-way, and stopping. The markers 16-3 and 16-4 of FIG. 5 represent traffic-control markers 36.

The navigation markers 38 are used for navigating and will be explained hereinafter. The navigation markers are also station-specific, i.e. associated with one of the station identifiers.

In FIG. 5 the marker 16-5 represents an exemplary navigation marker 38 announcing to the DTV 20-4 the branching-off point 30 of the station "1". The branch towards the station "1" occurs to the right in the travelling direction. The main route 22 extends further straight. This information is recorded in the marker 16-5 and will be read by the DTV 20-4 when travelling across. When the DTV 20-4 has stored the station "1" as the travelling destination the DTV 20-4 will exit to the marker 16-1 at the branching-off point 30 of FIG. 5 because the information of the marker 16-5 is associated with the corresponding station identifier coincidencing with the station identifier being associated with the travelling destination.

The marker 16-5 is positioned on the track 28 of the main route 22 in front of the branching-off point 30. In FIG. 5 the marker 16-5 is positioned, for example, 100 mm in front of the branching-off point 30. The DTV 20 travelling across the marker 16-5 and reading the same thus obtains the information that turning right towards the station "1" is possible at the next branching-off point 30.

Hence, in FIG. 5 DTVs 20 having the station "1" as their travelling destination will leave the main route 22 at the branching-off point 30 because the marker 16-5 signals the branch to the station "1". Thus, the DTV 20 use the navigation marker 16-5 for navigating. In each of the DTVs 20 corresponding navigation rules 64 (cf. FIG. 8) are recorded permanently, which are used by the DTVs 20 for interpreting the information read. This applies analogously to the traffic-control rules 62 being recorded in each of the DTVs 20, as will be explained hereinafter.

It is clear that, besides the Y-shaped branch illustrated in FIG. 5, other types of branches may be realized, such as ones having more than one branch.

With reference to the FIGS. 7 and 8 structure of the DTVs 20 will be explained in more detail below.

Figure 7A:
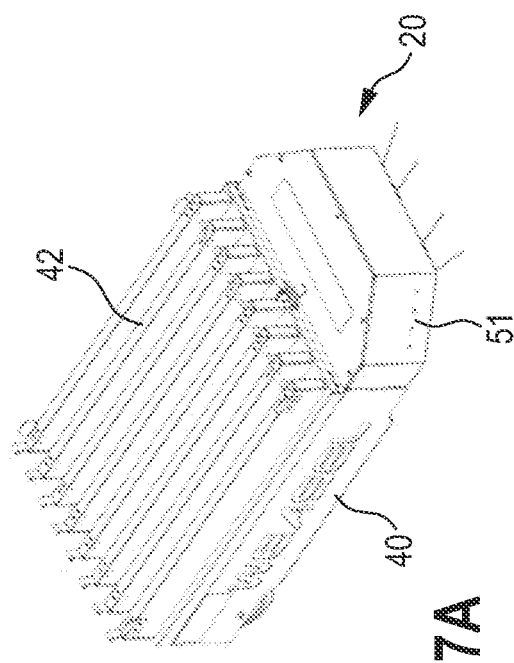
FIG. 7 shows a perspective top view (FIG. 7A) and a perspective bottom view (FIG. 7B) of a driverless transport vehicle.
Figure 7B:
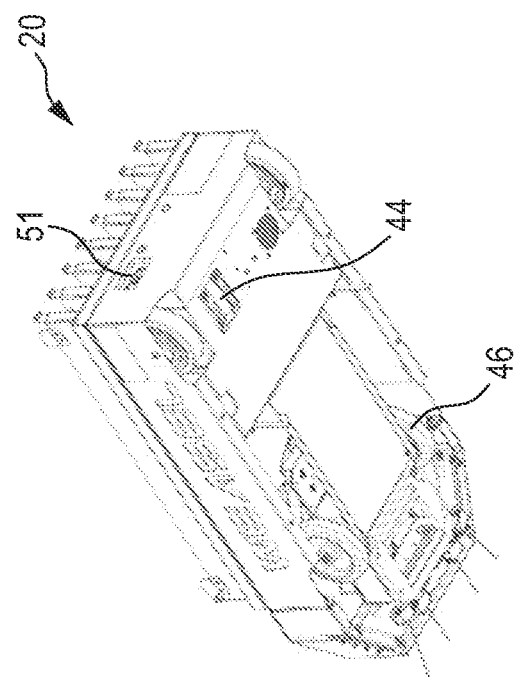

In FIG. 7 an exemplary DTV 20 sold under the brand "Weasel" is shown in a perspective top view (FIG. 7A) and in a perspective bottom view (FIG. 7B). FIG. 8 shows a generally valid block diagram of DTV 20 as used in the present disclosure.

The DTV 20 does not need to be configured due to the lacking master controller. This means that no unambiguous identifier of the DTV 20 needs to be transmitted to a superordinated control for implementing the navigation (path finding) and the control of traffic. The DTVs 20 autonomously implement these functions.

Each of the DTVs 20 comprises a chassis 40 on which, for example, a comb-like platform 42 can be arranged where goods of transportation (not depicted) are positioned. Each of the DTVs 20 further includes an energy source, which is not designated in more detail here, for being moved self-sufficiently through the travelling course 12. It goes without saying that it is also possible to provide the DTV 20 with a current collector 44.

Further, each of the DTVs 20 comprises a steering unit 46 enabling it to follow the tracks 28 which branch out. The steering unit 46 (FIG. 7B) is, like a drive 48, a component of a travelling unit 50 (FIG. 8). Further, the DTV 20 can comprise one or more lamps 52 for making operational states optically perceivable to the system operator.

Figure 8:
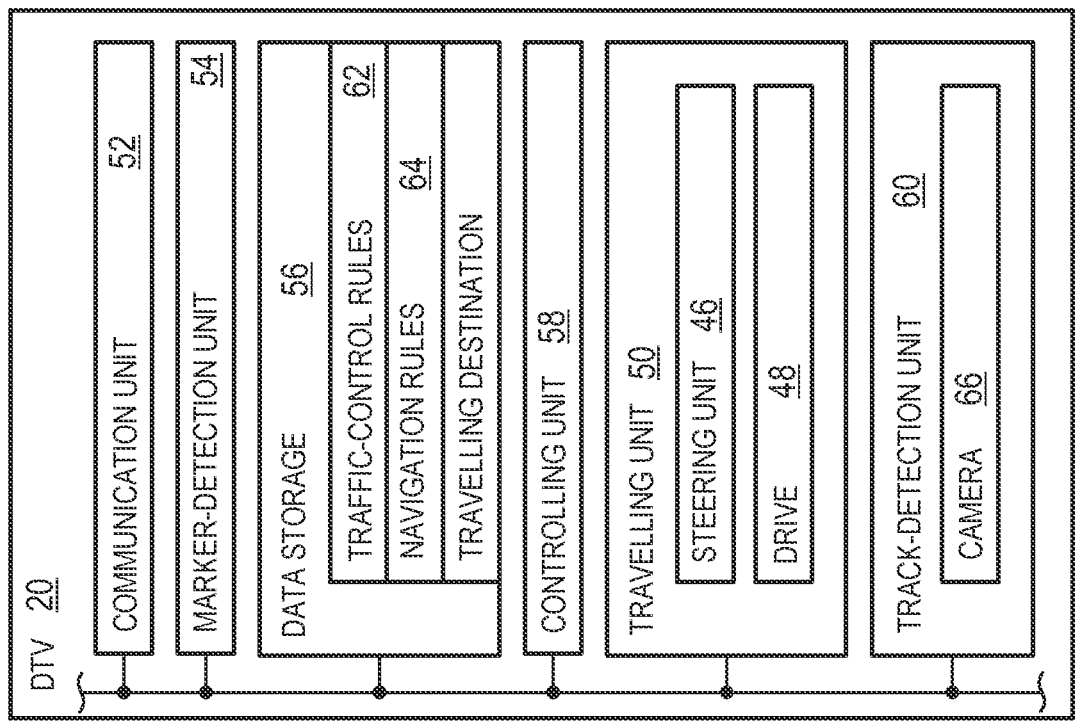
FIG. 8 shows a block diagram of a driverless transport vehicle.

Besides the travelling unit 60, as illustrated in the block diagram of FIG. 8, each of the DTVs 20 includes a communication unit 52, marker-detection unit 54, data storage 56, controlling unit 58, and track-detection unit 60 internally exchanging data with each other via data connection, not shown, in particular controlling signals.

The communication unit 52 is configured to exchange data (communicate) with another communication unit 52 of another DTV 20. For example, DTVs 20 can transmit or receive, by means of the communication unit 52, the station-specific signal of right-of-way, travelling orders, travelling destinations, and the like, as already described above in the context of FIG. 5.

The marker-detection unit 54 is configured to read information from the markers 16. Preferably, the reading is conducted contactless.

As mentioned above, the markers 16 can be implemented, for example, by RFID tags or QR codes. In this case, the marker-detection unit 54 is correspondingly configured to read the information from these markers 16 by the appropriate means. The marker-detection unit 54 can also be configured to write information to the markers 16. In particular, this is possible when the markers 16 are implemented by RFID tags.

The traffic-control rules 62 and the navigation rules 64 are recorded permanently in the data storage 56. The traffic-control rules 62 and the navigation rules 64 are the same for each of the DTVs 20. Further, travelling destination and last-read station identifier may be recorded therein.

The traffic-control rules 62 define, for example, when travelling across the marker 16-4 of FIG. 5, that the communication unit 52 is caused to transmit the signal of having the right-of-way (including the corresponding station identifier which is "1" in this case). The corresponding information is read by the marker-detection unit 54 from the marker 16-4, and processed by the controlling unit 58 such that the communication unit 52 is caused to transmit the station-specific signal of having the right-of-way.

When travelling across the marker 16-3 of FIG. 5, the marker-detection unit 54 detects the information that the corresponding DTV 20-2 is to be stopped when this DTV 20-2 receives a signal of having the right-of-way, which signal is associated with the identifier of the station "1". The corresponding data processing is performed again by the controlling unit 58 of this DTV 20-2, wherein the communication unit 52 of this DTV 20-2 is caused to analyze received signals of having the right-of-way. If a signal of having the right-of-way including the correct station identifier is received, this information is relevant for this DTV 20-2 and this DTV 20-2 stops. The corresponding logic is recorded in the above-mentioned traffic-control rules 62.

Also, the controlling unit 58 processes information from the (station-specific) navigation markers 38, such as from the marker 16-5 in FIG. 5. In this case, the controlling unit causes, based on the information from the marker 16-5, the generation of a navigation command which is correspondingly implemented by the travelling unit 50 of the DTV 20-4 (here: turn right to the station "1", wherein it is assumed that the station "1" is recorded as the travelling destination in the storage 56).

The term "controlling unit" as used here can include each processor-based or micro-processor-based system using, for example, a micro controller (such as SPS), a computer having a reduced set of commands (RISC), customer circuits (ASICS), logic circuits, or any other circuit or processor including hardware, software, or a combination thereof being configured for executing the here-described functions.

The controlling unit 58 of the DTV 20 can include, for example, one or more processors configured for controlling operation of the above-described DTVs 20. The controlling unit 58 is configured to execute instructions, stored in its data storage 56, for processing data.

The instructions can include various commands causing the DTVs 20, as processing machines, to conduct specific operations such as the described regulation of traffic and navigation. Typically, the instructions exist as software. It is clear that the instructions may also be implemented as hardware including instructions being correspondingly associated.

It is clear that the navigation is performed in a station-specific manner. In FIGS. 2 and 5 the stations 26 carry single-digit identifiers only. However, it is also possible to travel to the stations 26, when groups are considered, by defining the corresponding station identifiers with multiple digits.

Multiple-digit station identifiers indicate for each identifier digit one hierarchical stage. In a system which has, for example, three hierarchies, or groups, one possible travelling destination (destination station 26) comprises, for example, the identifier "352". In this case, one of the navigation markers 38 for the first hierarchical stage is realized in terms of the identifier "3xx" in order to indicate branch out from the main route 22 into a (sequentially arranged) third bay 34 (not depicted) of the hierarchical stage. The hierarchically next subgroup will be represented by the identifier "35x" or "5x", and represents the fifth bay 34 which in turn branches out from the above-mentioned bay 34 of the first hierarchical stage. The destination station 26 will carry the identifier "352" and represents the second branching-off bay 34 of the third hierarchical stage. With regard to navigation, In this manner very complex travelling courses 12 having many stations 26 can be imaged by branching out one or more bays 34 from already defined bays 34.

It is clear that the merging points 32 of multiple bays 34 can be united generally in one single merging point 32 (harp).

Figure 9:
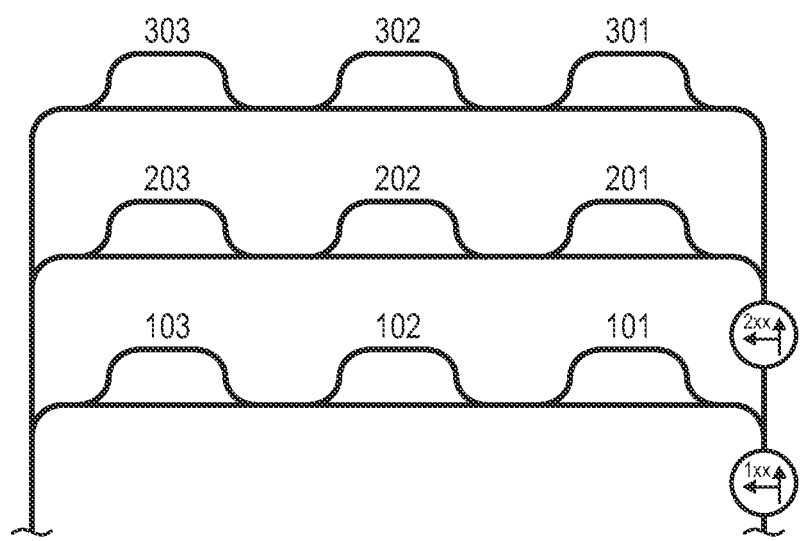
FIG. 9 shows a section of an exemplary travelling course including two stages of hierarchy.

FIG. 9 shows an exemplary travelling course 12 including two hierarchical stages, wherein each of the (main) bays 34 "1xx", "2xx" and "3xx" (1st stage) respectively comprises three stations 26 "x01", "x02" and "x03" (2nd stage).

Returning to FIG. 8 the track-detection unit 60 which can be implemented, for example, by a camera 60 (optical detection), or a magnetic sensor, permanently senses the track 28 (immediately) in front and/or behind the DTV 20.

The track-detection unit 60 is configured to detect a position and orientation of the track 28, and convert it into a corresponding signal, which will be evaluated by the controlling unit 58 for navigating the DTV 20 based on the navigation rules 64 through the travelling course 12 to the respective travelling destination. For this purpose, knowledge of the travelling destination alone is sufficient. Knowledge of intermediate points, or of the topology of the travelling course 12, is not required.

It is to be considered that the communication of the DTVs 20 between each other is performed directly by means of the communication units 52 of FIG. 8. This means that no switching devices, such as a prior art master controller, are connected therebetween. The DTVs 20 communicate directly with each other for controlling the traffic.

However, communication is performed in station-dependent and station-specific manners. The signals and information exchanged between the DTVs 20 include an "indication of location, or of area", which regulates for which area of the travelling course 12 the exchanged signals and the exchanged information are valid.

In the example of FIG. 5 the communication is performed regarding the station "1". This means that the DTVs 20 being present in the area of the station "1" do only respond to such ones of the DTVs 20 being also present in the area of the station "1" and transmitting the identifier of the station "1", or taking care that the corresponding identifier is received.

When one other DTV 20 staying in the area of a station "2" (not depicted) communicates (i.e., transmits and/or receives), this other DTV 20 does not interact with the DTV 20 of the station "1" because the identifiers of the stations "1" and "2" are different. Thus, it is possible to position stations so close to each other that communication between the DTVs 20 within different stations 26 is basically possible but an interaction does not occur due to the different station identifiers.

This control of the interaction can be assisted additionally in case the communication unit 52 preferably is a wireless short-distance communication unit 52. Short-distance communication units 52 communicate over short distances only, i.e. with a range of, for example, 10 m to 15 m in spaces. Thus, the short-distance communication range is locally limited. It is clear that the range depends on strength of transmitter, and thus can vary. The short-distance communication units 52 can be implemented, for example, by Bluetooth units, in particular of class 2 or Bluetooth LE.

Thus, the communication units 52 preferably communicate directly with each other via radio. Indeed, the installation of an area-covering WLAN system would also be possible but is not required because only such ones of the DTVs 20 need to communicate with each other for the purpose control of traffic which are positioned that close to each other that they may collide with each other. DTVs 20 which are so close to each other that they may collide, regulate the traffic amongst each other directly.

Travelling destinations can also be allocated via the (short distance) communication.

Optionally, each of the stations 26 can be provided with a terminal 70 (not depicted), cf. FIG. 5, which in turn comprises its own communication unit 52 configured to transmit and receive corresponding signals received and transmitted by the communication units 52 of the DTVs 20.

It is clear that there is no need to provide each of the stations 26 with one of the terminals 70. The DTS 10 can include one or more stations 26, which respectively have one terminal 70, and/or one or more stations 26 without any terminal 70.

Preferably, the terminal 70 (e.g., tablet, laptop, mini PC, smartphone, etc.) is positioned in the vicinity of the station markers 39 (cf. marker 16-1 in FIG. 5) where, for example, an operator (not depicted) can interact with the DTVs 20 (e.g., load, unload, etc.). The terminal 70 can be connected to separately provided travelling-order processing (not depicted) for transmitting travelling orders to the DTV 20s automatically.

The operator, or a central travelling order processing (not depicted), can transmit through the terminal 70 a new travelling destination to each (free) DTV 20, which then records this new travelling destination in its storage 56, and considers the same for navigation in the future.

In order to allow the DTV 20 to take over the new travelling destination, it should not have currently stored any travelling destination. The DTV 20 is free in this case. Also, the terminal 70 can request free DTVs 20 being on the way without any current travelling destination by transmitting a corresponding station-specific call signal (request signal) by means of the terminal 70.

A free DTV 20, such as the DTV 20-5 in FIG. 5, currently not having any travelling destination and reading the marker 16-6 in FIG. 5 receives this station-specific call, recognizes that it does not have any travelling order and travelling destination, and then travels to the marker 16-1 (station "1").

The marker 16-6 of FIG. 5 represents a further type of marker, namely a request marker 68 (cf. FIG. 6) causing the DTV 20-5 to check whether or not the DTV 20-5 currently has a travelling destination. If the DTV 20-5 determines that it does not have any travelling destination, the DTV 20-5 turns to the calling station 26 by recording, for example, the calling station 26 as the new travelling destination in the data storage 56 of the DTV 20-5, and also, if necessary, by informing the calling station 26 that the DTV 20-5 has accepted the request so that the terminal 70 of the station 26 can terminate its request.

When the DTV 20-5 reaches the marker 16-1, the DTV 20-5 transmits a corresponding information to the terminal 70, namely that it has arrived and that it is ready for storing a new travelling destination. This action (arrival and readiness to transmit to the terminal 70) can be recorded in the marker 16-6 and/or in the navigation rules 64. Then, the terminal 70 transmits the new travelling destination to the DTV 20-5 which waits at the marker 16-1. As soon as the travelling destination is recorded in the DTV 20-5, the DTV 20-5 autonomously begins, in accordance with the navigation rules 64, to navigate to this new destination.

Thus, the allocation of a new travelling destination can be caused manually by the operator, or automatically by the travelling-order processing which in this case is in (wireless or wired) communication with the (station-specific) terminal 70.

Also, the terminal 70 can be used for causing other actions such as temporarily parking one of the DTVs 20 in the associated station 26 (marker 16-1 in FIG. 5), charging an energy storage of the DTV 20 in the associated station 26, fully or partially automatic loading of the DTV 20 with empty containers, or the like.

Preferably, the terminal 70 is provided with a corresponding user interface allowing the operator to input the corresponding commands into the terminal 70. Thus, in particular, the terminal 70 is used in manually-operated facilities in which the DTVs 20 implement the material flow between different stations 26. In this manner, the operator can call on demand empty DTVs 20 via the terminal 70 to his station 26, and allocate a new travelling destination to DTVs 20 waiting. The correspondingly programmed DTVs 20 autonomously find their way through the travelling course 12, without colliding with other DTVs 20, and without using a coordinating computer.

However, the terminal 70 cannot only request a free DTV 20 but can also only transmit a new destination, or a sequence of destinations (such as "travel to station "5", receive an empty container there, and then travel to the station "3"), to free DTV.

LIST OF REFERENCE NUMERALS 10 driverless transport system (DTS)
12 travelling course
14 routes
16 markers
18 fleet
20 driverless transport vehicle (DTV)
22 main route
24 branch route
26 station
28 track
30 branching-off point
32 merging point
34 bay
36 traffic-control marker
38 navigation marker
39 station marker
40 chassis
42 platform
44 current collector
46 steering unit
48 drive
50 travelling unit
51 lamps
52 communication unit
54 marker-detection unit
56 data storage
58 controlling unit
60 track-detection unit
62 traffic-control rules
64 navigation rules
66 camera
68 request marker
70 terminal

The invention claimed is:

1. A driverless transport system, DTS, comprising:
  a travelling course formed of routes which are respectively defined by one track, and of markers;
  a fleet of at least two driverless transport vehicles, DTVs, travelling along the tracks in a forcibly guided manner; and
  at least one station defined by:
    at least one of the tracks,
    at least one of the markers, and
    an individualizing assigned station identifier;
  wherein each of the stations represents an area of the travelling course in which a new travelling destination can be allocated to the DTVs and/or in which the DTVs can be loaded, unloaded, energetically charged, and/or stopped;
  wherein the markers include information, which is station-specific by associating the respective information with the respectively assigned station identifier;
  wherein each of the DTVs comprises:
    a communication unit for transmitting and receiving information;
    a marker-detection unit for reading the information from the markers; and
    a controlling unit for processing read and received information, wherein the controlling unit is configured to:
      cause an interaction between the respective DTV and another one of the DTVs only if an information included in a marker read last by the respective DTV is associated with one of the station identifiers being identical to a station identifier which has been received last by the respective DIV from the other one of the DTVs; and
  wherein communication between the DTVs is performed directly.

2. The driverless transport system according to claim 1, wherein each of the stations comprises a terminal for allocating a travelling destination and wherein the controlling unit further configured to:
  cause an allocation of a new travelling destination, between the respective DTV and one of the terminals only if an information read last by the respective DTV from a marker is associated with one of the station identifiers being identical to a station identifier received last by the respective DTV from the one of the terminals; and
  wherein communication between the DTVs and the terminals is performed directly.

3. The driverless transport system according to claim 1, wherein
  the markers include traffic-control markers, wherein each of the traffic-control markers includes a station-specific information on regulation of right-of-way in the area of the respectively assigned station, and
  the controlling unit is further configured, when the last-read marker is a traffic-control marker, to cause continuation of travel of the respective DTV without any stop if the information from the last-read marker represents having right-of-way, and cause stop of the travel if the information from the last-read traffic-control marker represents obeying right-of-way and if information is received from another one of the other DTVs representing having right-of-way and being associated with the identical station identifier as the information from the traffic-control marker read last.

4. The driverless transport system according to claim 1, wherein each of the DTVs further comprises a data storage where traffic-control rules, are recorded permanently which are the same for each of the DTVs.

5. The driverless transport system according to claim 4, wherein in the data storage a DTV-specific travelling destination is further recorded overwritable, and wherein navigation through the travelling course to the DTV-specific travelling destination is controlled by the respective DTV alone by travelling to the DTV-specific travelling destination based on the navigation rules, and in particular further based on an information of a last-read navigation marker.

6. The driverless transport system according to claim 1, wherein the communication unit is configured for wireless short-distance communication.

7. The driverless transport system according to claim 1, wherein the markers further include station-specific navigation markers, which respectively include information on a branching-off point located nearest in a downstream direction.

8. The driverless transport system according to claim 7, wherein the controlling unit is further configured to generate, if the last-read marker is one of the navigation markers, based on the information from the last-read marker a corresponding navigation command, and output the same to a travelling unit of the DTV.

9. The driverless transport system according to claim 1, wherein each of the DTVs further comprises:
a track-detection unit;
a steering unit; and/or
a travelling unit configured to move the DTV along the tracks and stop the DTV.

10. The driverless transport system according to claim 1, wherein the routes are passed by each of the DTVs in one single direction only during a fixed period of time.

11. The driverless transport system according to claim 1, which is formed free of any master controller.

12. The driverless transport system according to claim 1, wherein the markers further comprise station markers.

13. The driverless transport system according to claim 12, wherein the station markers include, besides the assigned station identifiers, information on a respectively assigned type of station.

14. The driverless transport system according to claim 1, wherein the markers are re-writable data points which are positioned on, or along, the routes and to which new information can be written by the DTV or by means of an external data-writing device.

15. The driverless transport system according to claim 1, wherein the routes include:
a main route; and
at least one branch route.

16. The driverless transport system according to claim 15, which the at least one branch route defines a bay, a track of which is branched-off from the track in a branching-off point of the main route and the track of which is merged again, in a downstream merging point, with the track of the main route.

17. The driverless transport system according to claim 1, wherein the interaction between the respective DTV and another one of the DTVs is a regulation of right-of-way.

18. The driverless transport system according to claim 1, wherein the communication between the DTVs is performed directly and in a DTV-unspecific manner.

* * * * *